United States Patent [19]

Sheridan

[11] Patent Number: 4,495,433
[45] Date of Patent: Jan. 22, 1985

[54] DUAL CAPABILITY PIEZOELECTRIC SHAKER

[75] Inventor: Anthony A. Sheridan, Glen Burnie, Md.

[73] Assignee: The United States of America as represented by the Secretary of the Navy, Washington, D.C.

[21] Appl. No.: 554,419

[22] Filed: Nov. 22, 1983

[51] Int. Cl.³ .......................................... H01L 41/08
[52] U.S. Cl. .................................. 310/329; 73/10 V; 73/517 R
[58] Field of Search ................ 310/311, 329; 73/1 D, 73/1 DV, DIG. 4, 517 AV, 517 R

[56] References Cited

U.S. PATENT DOCUMENTS

| | | | |
|---|---|---|---|
| 2,625,152 | 1/1953 | Frohring | 310/329 X |
| 2,661,622 | 12/1953 | Severs | 73/1 DV |
| 2,849,629 | 8/1958 | Kissinger | 310/329 |
| 2,873,426 | 2/1959 | Dranetz | 310/329 X |
| 2,873,604 | 2/1959 | Samsel | 310/329 X |
| 3,070,996 | 1/1963 | Schloss et al. | 310/329 X |
| 3,104,334 | 9/1963 | Bradley et al. | 310/329 |
| 3,120,622 | 2/1964 | Dranetz et al. | 310/329 |
| 3,333,236 | 7/1967 | Schloss | 73/1 DV |
| 3,830,091 | 8/1974 | Sinsky | 73/1 D |
| 3,858,065 | 12/1974 | Epstein | 310/329 |

OTHER PUBLICATIONS

Jones, Yelon, and Edelman, "Piezoelectric Shakers for Wide-Frequency Calibration of Vibration Pickups," Journal of the Acoustical Society of America, vol. 45, No. 6, pp. 1556-1559, Jun., 1969.

*Primary Examiner*—Mark O. Budd
*Attorney, Agent, or Firm*—R. F. Beers; L. A. Marsh

[57] ABSTRACT

A shaker for performing both absolute and comparison accelerometer calibration. A reference accelerometer is mounted within or attached to a shaker head and calibrated with the shaker head by an absolute method. The shaker, thus calibrated absolutely, becomes a portable device for performing comparison calibrations on other accelerators which can be mounted on its shaker head.

5 Claims, 1 Drawing Figure

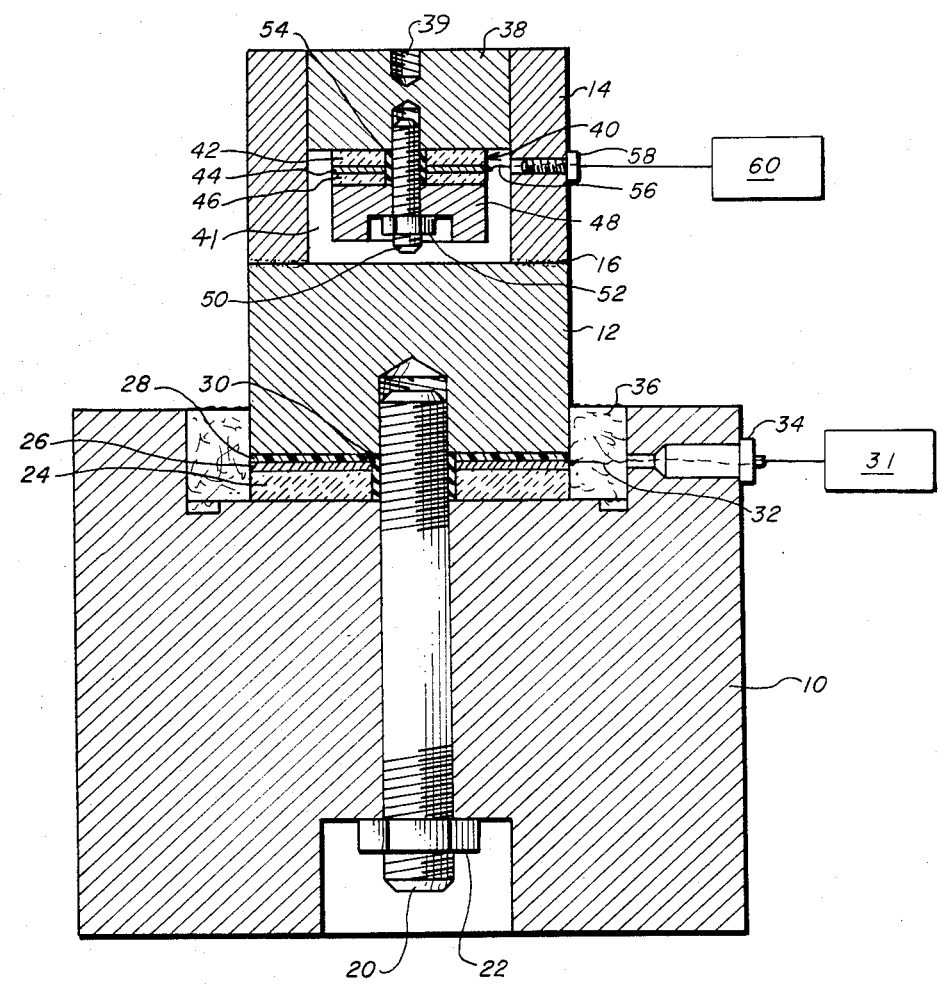

DUAL CAPABILITY PIEZOELECTRIC SHAKER

BACKGROUND OF THE INVENTION

1. Field of the Invention

This invention relates to electromechanical transducer devices and particularly to piezoelectric shakers for calibrating accelerometers.

2. Description of the Prior Art

Piezoelectric accelerometers dynamically sense harmonic and non-harmonic acceleration, random acceleration and shock acceleration. When calibrated, accelerometers can electrically measure whatever acceleration they sense. Calibration establishes accelerometer sensitivity in terms of electrical output as a function of input force. Accelerometer sensitivity remains consistent up to about 5 kHz, but above this frequency, sensitivity increases with frequency increases. This rate of change of sensitivity, which directly affects the electrical output, is unpredictable, and as a consequence, high frequency dynamic calibration is necessary. Such calibration requires a device to provide sinusoidal motion with low distortion over a wide range of frequencies as the input force. Piezoelectric shakers, which convert controlled electrical input into sinusoidal motion, are well suited for this function.

Absolute calibration can be achieved by using the interferometric fringe disappearance method to measure absolute displacements based on the wave length of light. Comparison calibration is performed by comparing the output of a certified accelerometer, generally one that has undergone absolute calibration, against the output of the accelerometer being calibrated. This has been a two-step process that has prevented accelerometer calibration at the test site, and has additionally resulted in rather severe time and cost penalties inasmuch as the comparison requires that both the standard accelerometer and the one to be comparison calibrated against it must be set up separately on the shaker head.

SUMMARY OF THE INVENTION

These problems are solved by the present invention by building an accelerometer into a cavity within the shaker head. The accelerometer to be calibrated can then be mounted externally on the shaker head and the outputs of both can be simultaneously generated. The shaker with its built-in accelerometer can be used on a regular basis for comparison calibrations and the performance of the shaker and its built-in accelerometer need only be periodically checked by absolute calibration techniques.

Accordingly, one object of the present invention is to provide a new and improved shaker device.

Another object of the invention is to provide a shaker with dual capability to provide absolute and comparison calibrations.

A further object is to provide a shaker with a built-in accelerometer than can be portably used to perform calibrations at test sites.

A still further object of the invention is to provide a shaker that can comparison calibrate accelerometers more quickly and economically than can be accomplished with existing equipment and techniques.

Other objects, advantages, and novel features of the invention will become apparent from the following detailed description of the invention when considered in conjunction with the accompanying drawings wherein:

BRIEF DESCRIPTION OF THE DRAWINGS

The FIGURE shows a cross-sectional view of the dual capability shaker.

DETAILED DESCRIPTION OF THE DRAWINGS

The FIGURE shows a steel shaker base, 10, and a two-part shaker head consisting of a cylindrical aluminum lower section, 12, and an annular aluminum upper section, 14. The base, 10, is drilled axially to receive a stud, 20, threaded on each end. The upper end of the stud is received into a threaded axial hole in the lower section of the shaker head, 12. The lower surface of the shaker base, 10, is counterbored to receive a nut, 22, which engages the lower threaded end of the stud, 20. The upper surface of the shaker base, 10, is counterbored and an annular thickness expander piezoelectric disc, 24, is disposed on the upper surface of the counterbore around the stud, 20. The mating surfaces of the shaker base, 10, and the piezoelectric disc, 24, are machined optically flat. An annular brass shim electrode, 26, fits around the stud, 20, in contact with the upper surface of the piezoelectric disc, 24. An annular insulator disc, 28, of kapton polymide film, for example, fits around the stud, 20, in contact with the upper surface of the electrode, 26, and the lower surface of the lower section of the shaker head, 12. A section of electrically insulating hollow tubing, 30, for instance tygon tubing, fits around the stud, 20, extending from the upper surface of the shaker base, 10, to the lower surface of the lower section of the shaker head, 12, to insulate the piezoelectric disc, 24, and electrode, 26, from the stud, 20. The lower section of the shaker head, 12, the insulator disc, 28, the electrode, 26, and the piezoelectric disc, 24, are held in a compressive relationship with the shaker base, 10, through tightening of the nut, 22 on the stud, 20.

The brass shim, 26, acts as the positive electrode and is connected to the shaker input source, 31, by an input wire, 32 that passes through a bulkhead connector, 34, for instance, a BNC connector, mounted on the shaker base, 10. The input source, 31, supplies the driving voltage to the thickness expander piezoelectric disc, 24, to produce controllable sinusoidal motion, and typically consists of an oscillator, amplifier and step-up transformer. The shaker base, 10, acts as the ground to complete the shaker input circuit. A flexible electric insulator material, 36, for instance RTV silicon rubber, is used to fill the volume within the counterbore between the shaker head lower section, 12, insulator disc, 28, electrode disc, 26, and piezoelectric disc, 24, and the shaker base, 10. This flexible material, 36, provides protection and insulation for the shaker elements and the input lead, 32.

The shaker head consists of an aluminum lower cylindrical section, 12, into which the stud, 20, is threaded, and an aluminum annular upper section, 14. A steel cylindrical insert, 38, is shrink-fitted into the upper portion of the annular opening in the upper shaker head, 14. The insert, 38, is shorter than the annular upper section of the shaker head, 14, leaving a cylindrical axial cavity in the lower portion of the annular upper section, 14, of the shaker head. The insert, 38, is axially drilled and threaded on its top surface to form an axial mounting means, 39, for the attachment of accelerometers to be calibrated. The insert, 38, is also drilled and threaded axially on its lower surface. An annular reference accelerometer, 40, is attached to the lower surface of the insert, 38, within the cylindrical cavity, 41, created by the insert, 38, and the upper shaker head section, 14. Any suitable accelerometer, depending on the sizing constraints and desired frequency response, can be used. For illustration the reference accelerometer shown in the FIGURE consists of a second annular piezoelectric crystal, 42, the upper surface of which is in contact with the lower surface of the insert, 38. A second annular brass shim electrode, 44, is disposed on the lower surface of the upper piezoelectric crystal, 42, and a third annular piezoelectric crystal, 46, is positioned against the second brass shim electrode, 44. An annular mass member, 48, is positioned with its upper surface against the third, lower piezoelectric crystal, 46. A second stud, 50, threaded on each end, passes through the annular openings in the mass member, 48, third Piezoelectric crystal, 46, second brass shim electrode, 44, and second, upper piezoelectric crystal 42, and is received by the threaded drilled axial orifice in the lower surface of the steel insert, 38, and these components are held in compression by a second nut, 52, tightened on the lower threaded end of the stud, 50. A second section of electrically insulating hollow tubing, 54, is fit around the stud, 50, extending from the insert, 38 to the mass member, 48, to insulate the second and third piezoelectric crystals, 42 and 46, and the brass shim electrode, 44, from the stud, 50. The output signal from the piezoelectric crystals, 42 and 46, is conducted through the brass shim electrode, 44, to an output wire, 56, which passes through an electrical output connector, 58, for instance, a microdot connector, attached to the upper section of the shaker head, 14, and is electrically coupled to a device, 60, for detecting and recording the output signal, typically a charge amplifier, filter, and digital voltmeter.

The upper section of the shaker head, 14, with its built-in accelerometer, 40, is attached to the lower section of the shaker head, 12, by an adhesive, 16, such as Eastman 910, cyanacrylate, that can be disengaged with a solvent to provide access to the cavity-mounted accelerometer, 40.

The Shaker is essentially a simple spring-mass mechanical oscillator which applies the piezoelectric principle to maintain a controlled sinusoidal driving force over the frequency range. The thickness expander piezoelectric disc, 24, behaves as a very stiff spring and the low density shaker head behaves as the oscillator mass.

The massive base, 10, of the shaker performs as a reaction mass which reacts against the stiff piezoelectric material and the mass of the shaker head.

The built-in reference accelerometer, 40, in the shaker head makes it possible to comparison calibrate accelerometers attached to the shaker head. The built-in accelerometer is calibrated by the absolute calibration method by placing the displacement measuring mirror of an interferometer system at the exact center of the shaker head. After the absolute calibration is completed, the displacement measuring mirror is removed and accelerometers to be comparison calibrated against the absolute sensitivity of the built-in accelerometer, 40, can be attached in its place. The shaker, with its built-in reference accelerometer, 40, can then be used on a regular basis for accelerometer comparison calibration and the performance of both the shaker and its built-in accelerometers can be periodically checked by the absolute calibration procedure. A shallow concentric ring groove can be machined into the lower surface of the shaker base into which a rubber "O" ring can be cemented to provide a compliant isolation mount for the shaker.

In order to minimize mechanical distortion, it is essential that the interfaces between the shaker base and the piezoelectric crystal and between the shaker head and piezoelectric crystal be machined to optical flatness. A practical alternative to machining such surfaces directly on the shaker components would be to separately machine protective rings that would bolt to the shaker components to provide optically flat mounting surfaces for the piezoelectric crystals.

The frequency range over which the subject invention could provide accurate accelerometer calibration is, as with any shaker device, a function of the spring and mass relationship between the thickness expander piezoelectric crystal and the shaker head mass. In the embodiment illustrated in the FIGURE, the shaker head mass is kept low by the use of aluminum for 12 and 14, and the size of the contained cavity, 41, while durability, or wear-resistance, is provided for the interface between the shaker and the accelerometers to be calibrated by the steel insert, 38. Other materials, such as titanium and berylium could be used for the shaker head components.

A one-piece shaker head could be used with an externally mounted ring-shaped shear-type piezoelectric crystal element in applications where the protection afforded by the internal mounting of the accelerometer in the FIGURE is not important.

Obviously, many other modifications and variations of this invention are possible in light of the above teachings. It is therefore to be understood that within the scope of the appended claims the invention may be practiced otherwise than as specifically described.

What is claimed is:

1. A shaker device for performing absolute and comparison calibration of accelerometers, comprising:
    a massive shaker base;
    a shaker head having a cylindrical axial cavity in a lower portion thereof;
    at least one expander piezoelectric disc disposed between the shaker base and shaker head;
    means for providing an input driving voltage over a predetermined continuous frequency range to the at least one expander piezoelectric disc such that comparison calibration can be accomplished at points over said predetermined continuous frequency range;
    a reference accelerometer mounted axially within the cylindrical axial cavity of said shaker head;
    means electrically coupled to said reference accelerometer for detecting and recording an output signal; and
    means for mounting accelerometers to be calibrated on said shaker head.

2. A shaker device for performing absolute and comparison calibration of accelerometers, comprising:
    a massive shaker base;
    a shaker head;
    means for producing controllable sinusoidal motion over a predetermined continuous frequency range in the shaker head such that comparison calibration can be accomplished at points over said predetermined continuous frequency range;
    means for mounting accelerometers to be calibrated on said shaker head; and a ring-shaped shear-type piezoelectric crystal reference accelerometer mounted around said accelerometer mounting means on the shaker head.

3. A shaker device for performing absolute and comparison calibration of accelerometers, comprising:

a massive shaker base;

a shaker head having a cylindrical axial cavity in a lower portion thereof, said shaker head further comprising
a solid lower section,
an upper section having said cylindrical axial cavity in a lower portion thereof, and
bonding means disposed between said solid lower section and said upper section for detachably bonding said upper section to said solid lower section, and wherein said bonding means further comprises a solvent disengageable adhesive to provide access to said cylindrical axial cavity;

at least one expander piezoelectric disc disposed between said shaker base and said shaker head;

means for providing an input driving voltage to said at least one expander piezoelectric disc;

a reference accelerometer mounted axially within said cylindrical axial cavity of said shaker head;

means electrically coupled to said reference accelerometer for detecting and recording an output signal; and means for mounting accelerometers to be calibrated on said shaker head.

4. The shaker device as claimed in claim 3 wherein said upper section of said shaker head further comprises:

an annular aluminum upper portion; and a cylindrical steel insert section shrink-fitted into said axial cylindrical cavity of said annular aluminum upper portion to provide durable mounting surfaces for said reference accelerometer and accelerometers to be calibrated.

5. The shaker device as claimed in claim 4 wherein said durable mounting surfaces of said cylindrical steel insert section further comprises optically flat mounting surfaces.

* * * * *